(12) United States Patent (10) Patent No.: US 9,497,336 B2
Asai (45) Date of Patent: Nov. 15, 2016

(54) DISPLAY PROGRAM AND DISPLAY APPARATUS

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/291,038

(22) Filed: May 30, 2014

(65) Prior Publication Data

US 2014/0355061 A1 Dec. 4, 2014

(30) Foreign Application Priority Data

May 31, 2013 (JP) .................................. 2013-114956

(51) Int. Cl.
*G06F 3/12* (2006.01)
*H04N 1/00* (2006.01)
*H04B 5/00* (2006.01)
*H04B 7/00* (2006.01)
*H04W 4/00* (2009.01)
(Continued)

(52) U.S. Cl.
CPC .... *H04N 1/00307* (2013.01); *H04N 2201/006* (2013.01); *H04N 2201/0094* (2013.01); *H04W 4/008* (2013.01); *H04W 84/12* (2013.01); *H04W 88/06* (2013.01)

(58) Field of Classification Search
CPC .. G06F 3/1203; G06F 3/1211; G06F 3/1236; G06F 3/1238; G06F 3/1268; G06F 3/1271; G06F 3/1285; G06F 3/1292; G06F 3/1297; G06K 15/40; H04M 1/7253; H04W 4/008; H04W 84/12; H04W 88/06; H04N 1/00278; H04N 1/00307; H04N 1/0097; H04N 1/00127; H04N 1/00204; H04N 1/00408; H04N 1/00482; H04N 1/32797
USPC ....... 358/1.11–1.18, 1.1, 400–406; 455/41.1, 455/41.2, 41.3, 456.1, 456.3, 550.1; 348/2.701, 207.2, 207.99, 207.1
See application file for complete search history.

(56) References Cited

U.S. PATENT DOCUMENTS

2004/0048571 A1* 3/2004 Kiyose .................... G01C 21/16
455/41.2
2009/0103124 A1* 4/2009 Kimura ................. G06F 3/1204
358/1.15

(Continued)

FOREIGN PATENT DOCUMENTS

JP 2009-251823 A 10/2009
JP 2010-157922 A 7/2010
JP 2010157922 A * 7/2010

*Primary Examiner* — Chad Dickerson
(74) *Attorney, Agent, or Firm* — Banner & Witcoff, Ltd.

(57) ABSTRACT

A wireless communication device may have a processing unit for executing a first program and a communication interface configured to communicate with an external apparatus such as an image forming apparatus by way of a short-range communication protocol. The wireless communication device may determine whether a prescribed condition is satisfied under a condition that a specific display screen has been displayed on the wireless communication device by a second program different from the first program. The specific display screen may be displayed based on the wireless communication device being in communication with the external apparatus using a short-range communication protocol. The wireless communication device may display a message regarding communication between the wireless communication device and the external apparatus using the short-range communication protocol in response to determining that the prescribed condition is satisfied.

14 Claims, 9 Drawing Sheets

(51) Int. Cl.
  *H04W 84/12* (2009.01)
  *H04W 88/06* (2009.01)

(56) References Cited

U.S. PATENT DOCUMENTS

2010/0188695 A1* 7/2010 Okigami ............. H04M 1/7253
                                                      358/1.15
2011/0043857 A1   2/2011 Hiroki
2011/0177780 A1*  7/2011 Sato .................. H04W 36/14
                                                      455/41.1
2013/0229690 A1*  9/2013 Sumita ............... H04N 1/00127
                                                      358/1.15
2013/0324169 A1* 12/2013 Kamal ................. H04W 4/008
                                                      455/466
2014/0226171 A1*  8/2014 Tredoux ............. H04N 1/00225
                                                      358/1.13

\* cited by examiner

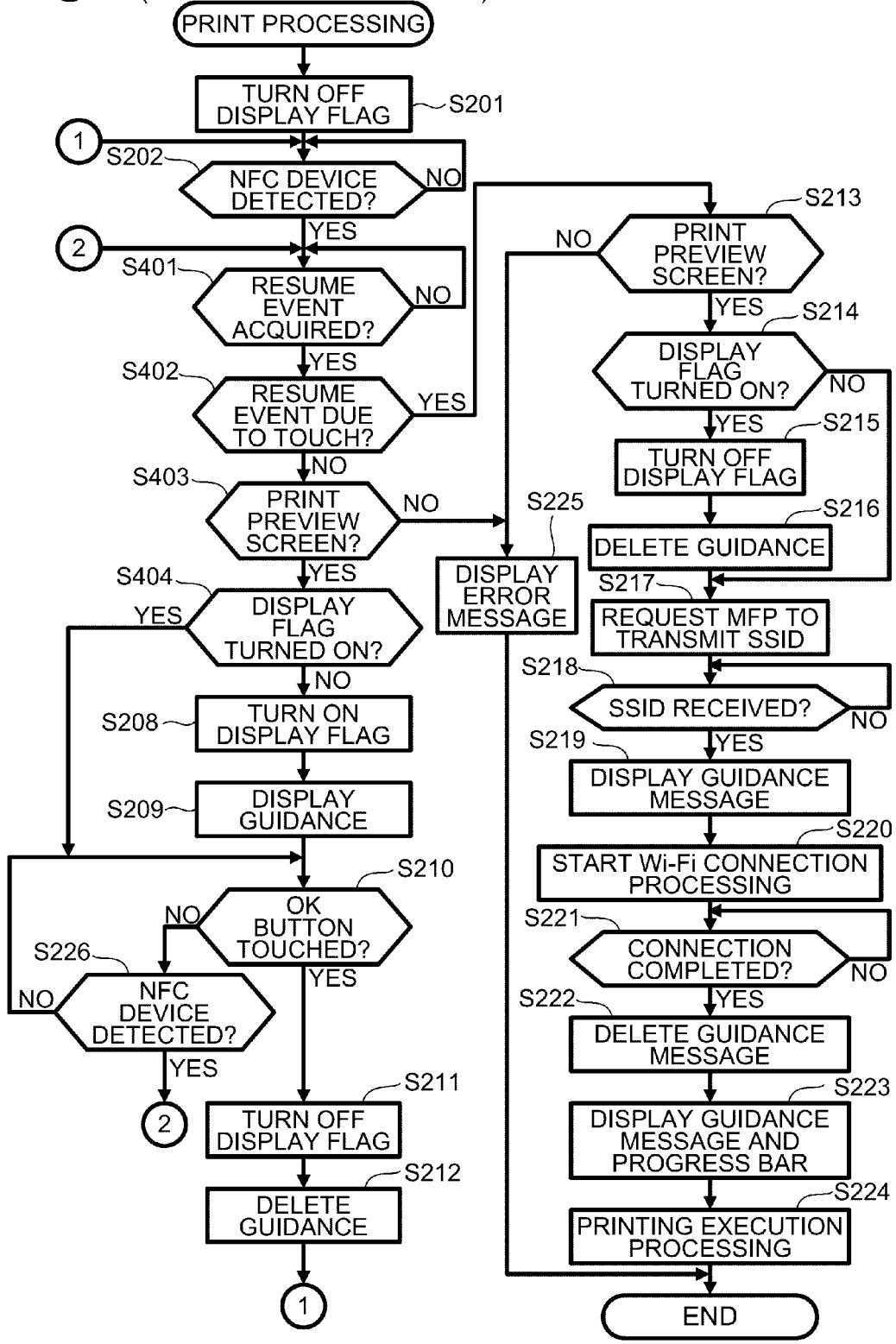

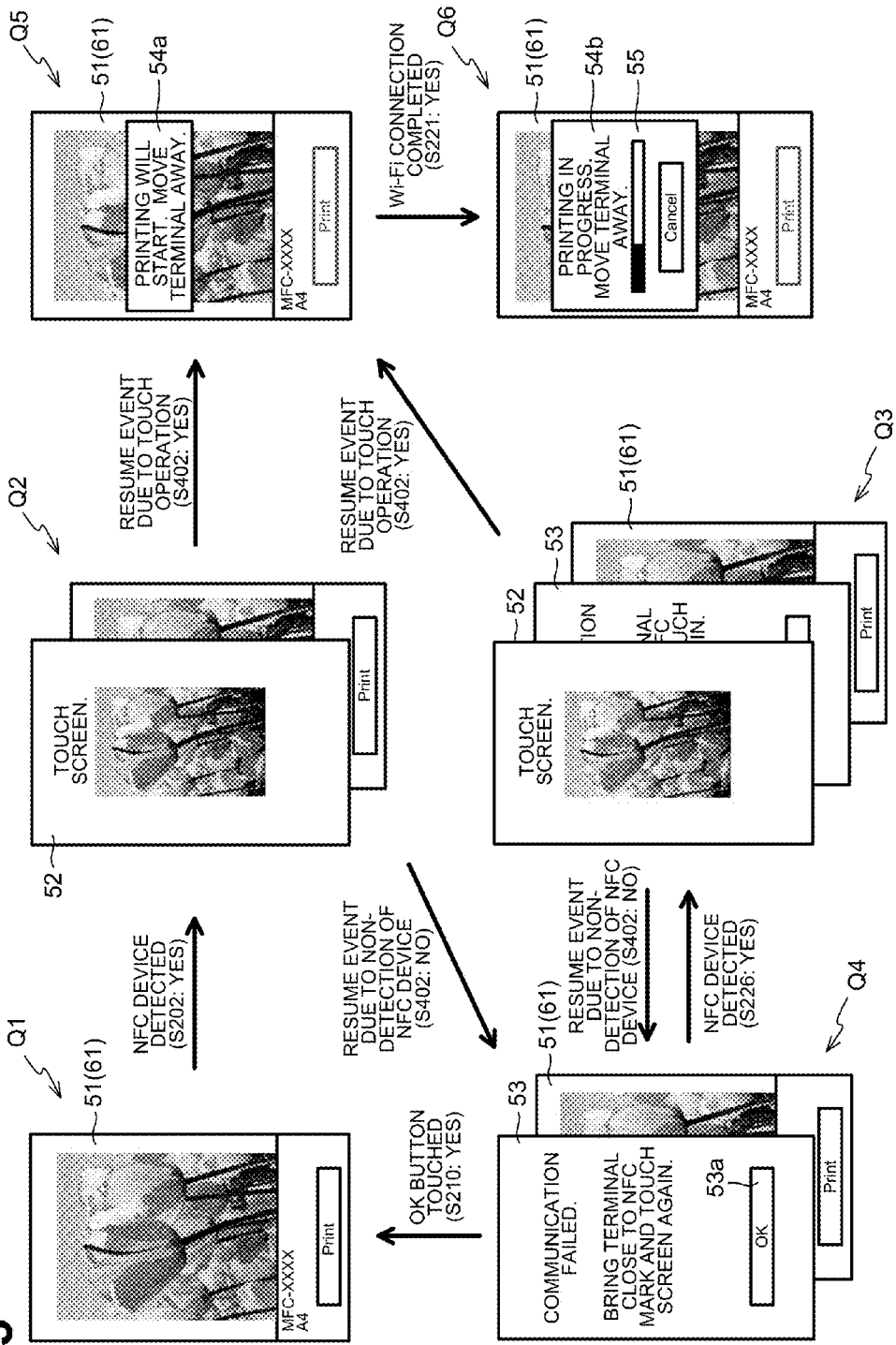

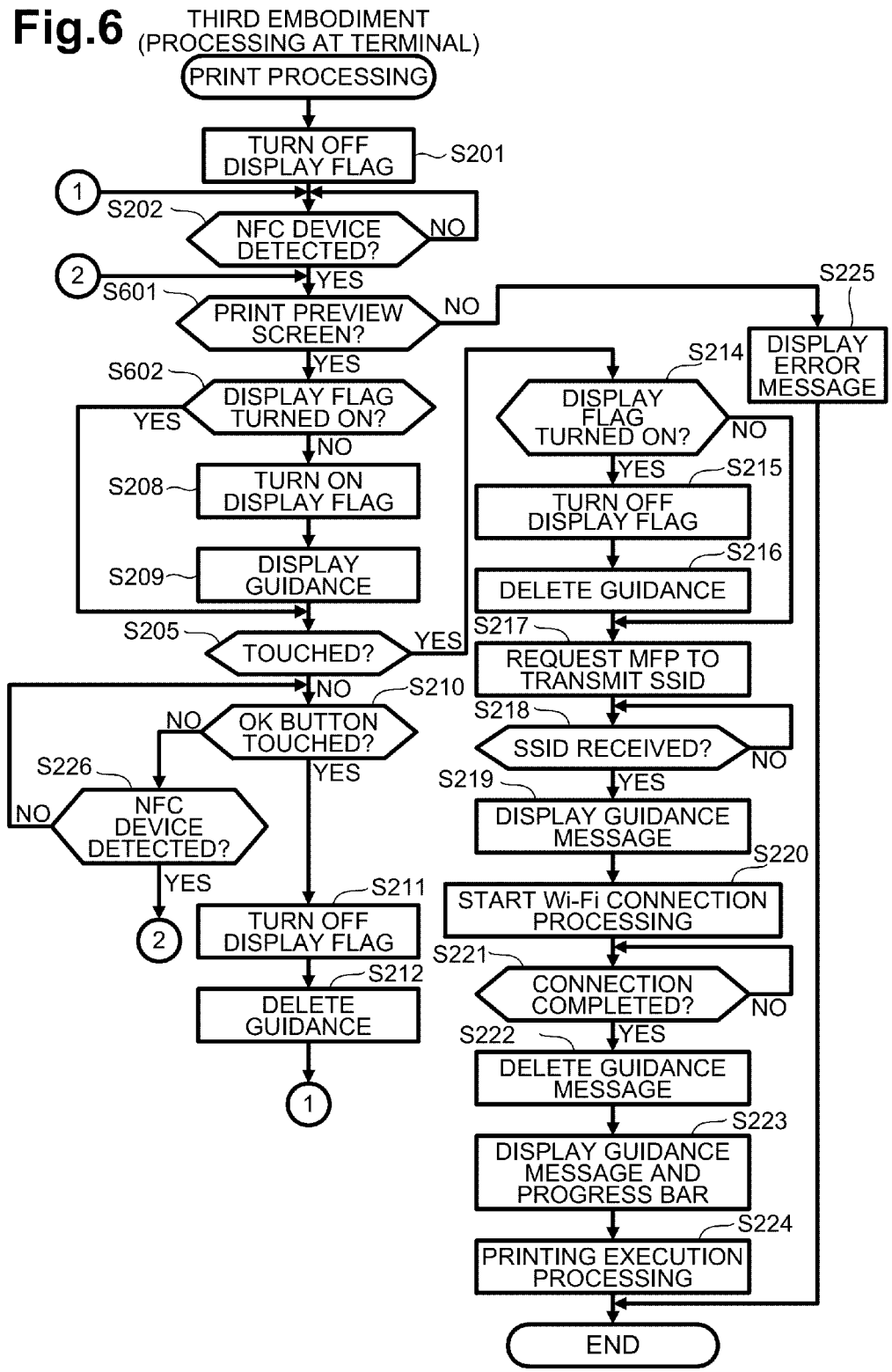

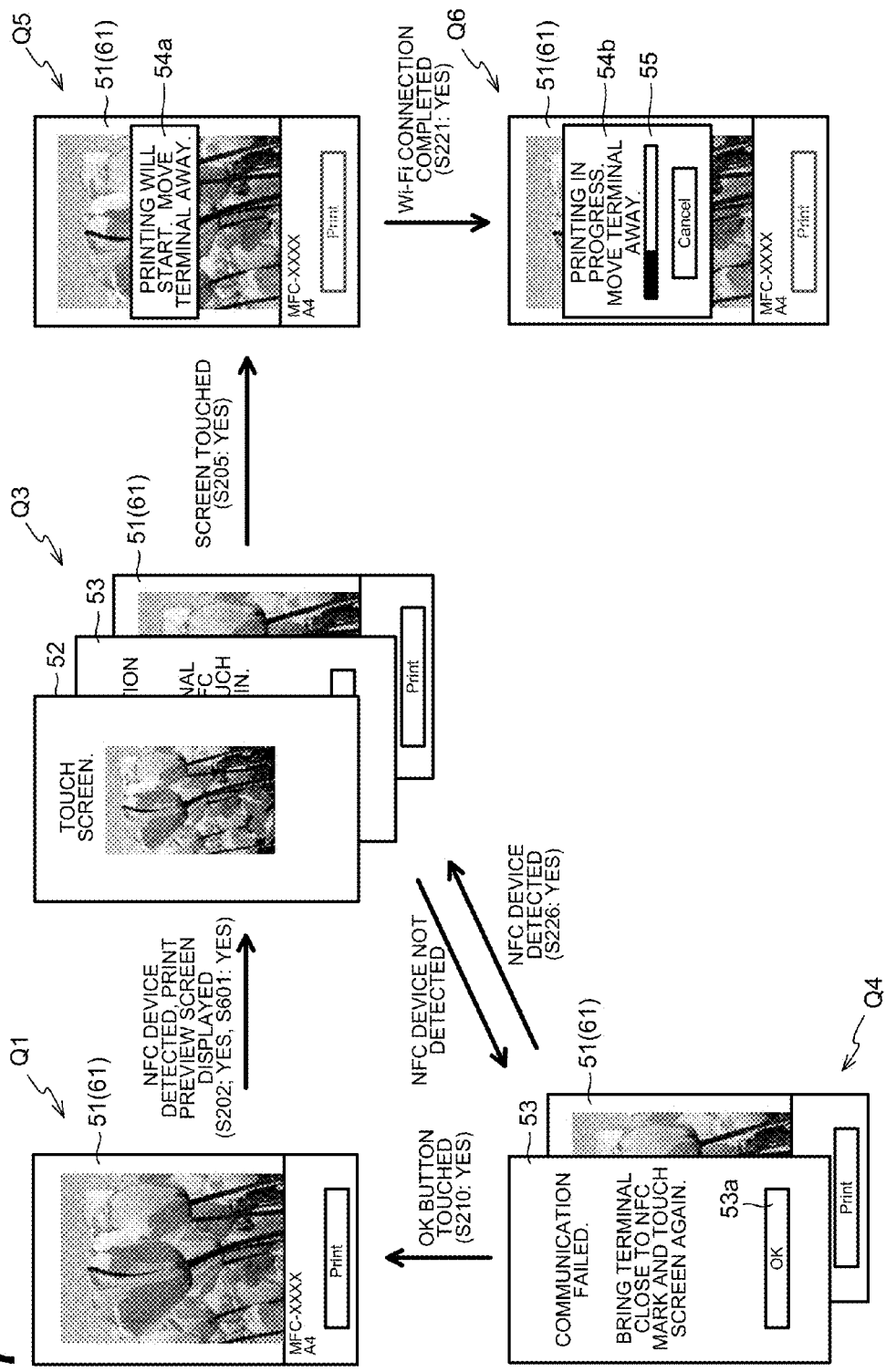

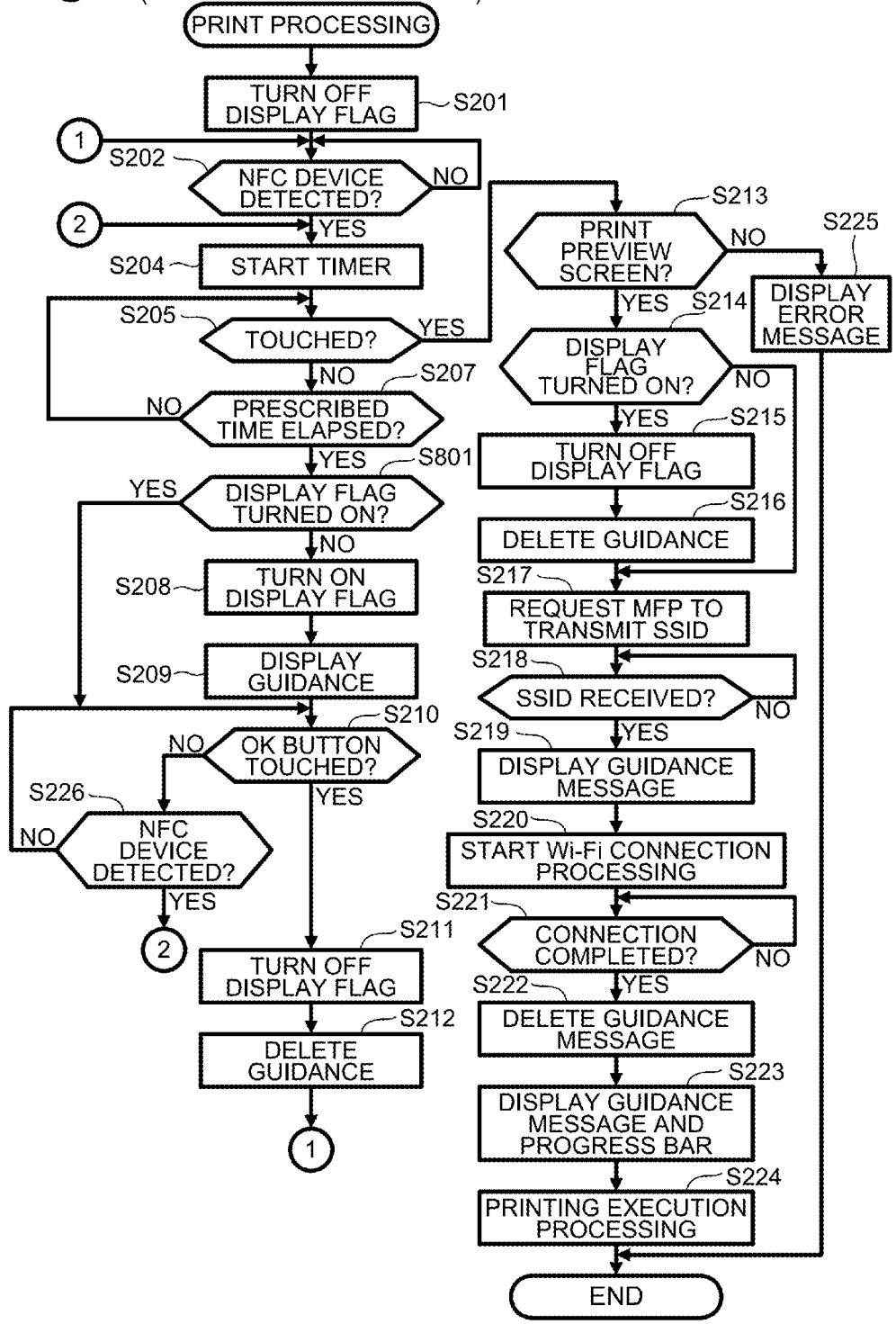

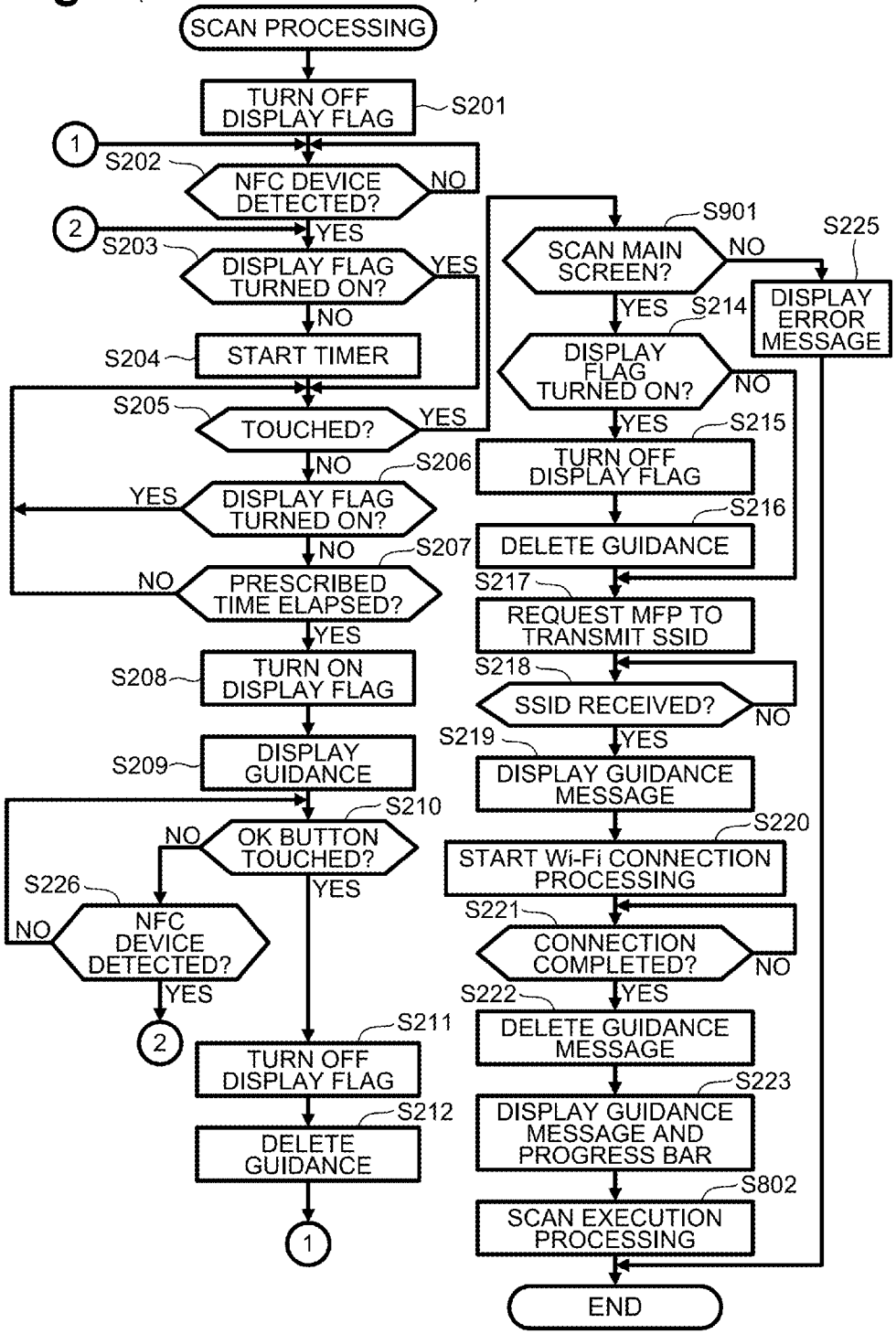

DISPLAY PROGRAM AND DISPLAY APPARATUS

CROSS-REFERENCE TO RELATED APPLICATION

This application claims priority from Japanese Patent Application No. 2013-114956 filed on May 31, 2013, which is incorporated herein by reference in its entirety.

FIELD OF DISCLOSURE

The disclosure herein relates to a display program and a display apparatus.

BACKGROUND

An information processing apparatus that is known in the prior art creates print data and transmits it to a print unit when the information processing apparatus detects that a distance from the print unit has become a distance over which near field communication is possible.

BRIEF SUMMARY

External apparatuses, such as the information processing apparatus described above, that cause a print unit to perform print processing through near field communication are used in various ways according to the model of each external apparatus, the operation system installed in the external apparatus, and its other features. If the user of the external apparatus does not have a sufficient understanding of the features of the external apparatus, the user may not be able to use it well and may not be able to cause the print unit to perform print processing.

A wireless communication device may have a processing unit for executing a first program and a communication interface configured to communicate with an external apparatus such as an image forming apparatus by way of a short-range communication protocol. The wireless communication device may determine whether a prescribed condition is satisfied under a condition that a specific display screen has been displayed on the wireless communication device by a second program different from the first program. The specific display screen may be displayed based on the wireless communication device being in communication with the external apparatus using a short-range communication protocol. The wireless communication device may display a message regarding communication between the wireless communication device and the external apparatus using the short-range communication protocol in response to determining that the prescribed condition is satisfied.

The disclosure addresses the above situation with the object of providing a display apparatus that is superior in convenience when the user causes an external apparatus to perform prescribed processing through near field communication.

This summary is not intended to identify critical or essential features or aspects of the disclosure, but instead merely summarizes certain features and variations thereof. Other details and features will also be described in the sections that follow.

BRIEF DESCRIPTION OF THE DRAWINGS

Aspects of the disclosure are illustrated by way of example and not by limitation in the accompanying figures in which like reference characters indicate similar elements.

FIG. 4 is a flowchart illustrating print processing in a second embodiment according to aspects of the disclosure.

FIG. 5 schematically illustrates an example of screen transition in the second embodiment according to aspects of the disclosure.

FIG. 6 is a flowchart illustrating print processing in a third embodiment according to aspects of the disclosure.

FIG. 7 schematically illustrates an example of screen transition in the third embodiment according to aspects of the disclosure.

FIG. 8 is a flowchart illustrating print processing in a fourth embodiment according to aspects of the disclosure.

FIG. 9 is a flowchart illustrating scan processing according to aspects of the disclosure.

DETAILED DESCRIPTION

Figure 1:
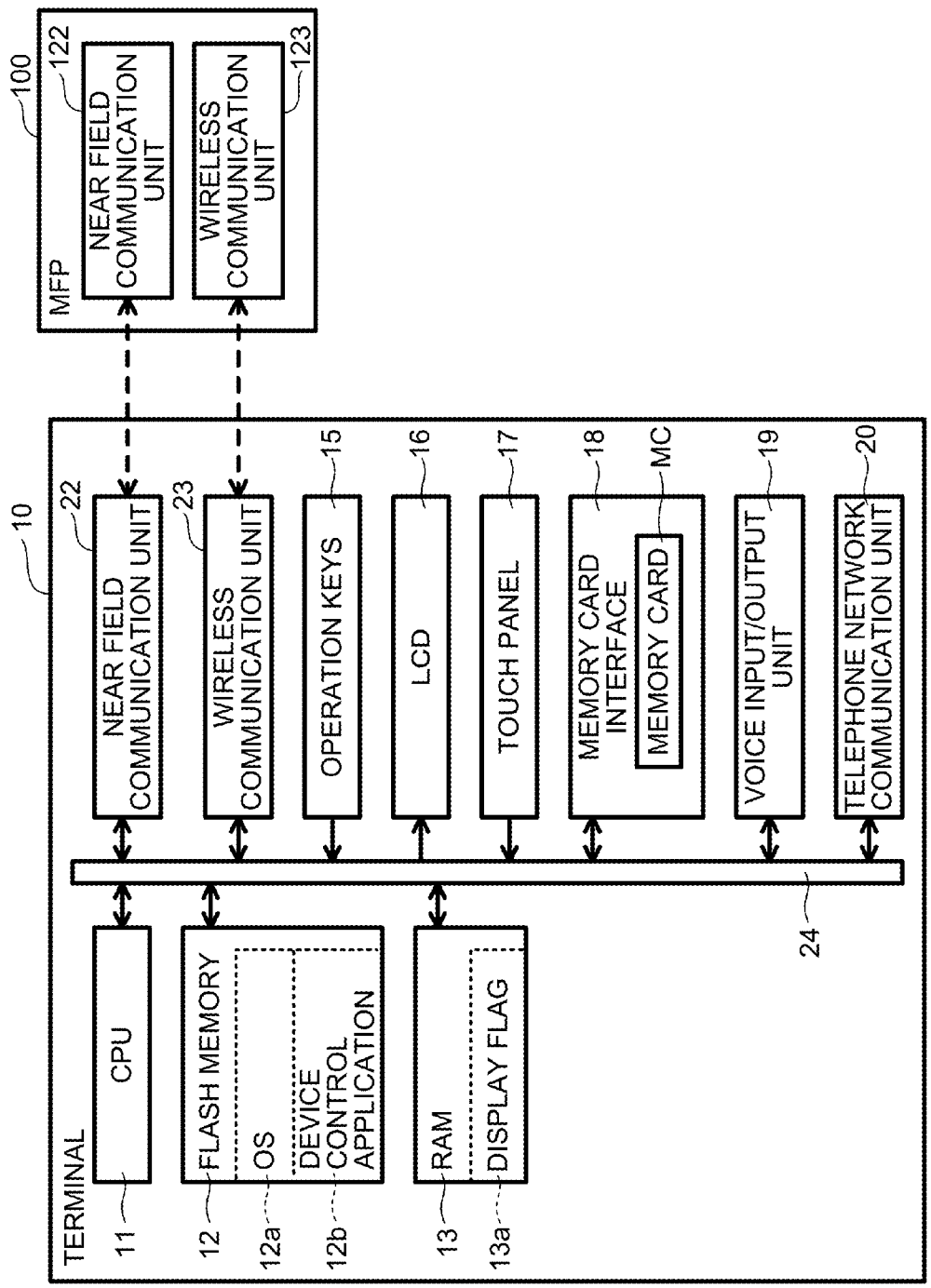
FIG. 1 is a block diagram that illustrates the electrical structure of a terminal according to aspects of the disclosure.

Example embodiments will be described below with reference to the drawings. FIG. 1 is a block diagram illustrating the electrical structure of a terminal 10 in which a device control application 12b, which is an embodiment of a display program, is included. Although details will be described later, the terminal 10 including the device control application 12b is superior in convenience when the user uses the print function of a multi-function peripheral (MFP) 100, that is, causes the MFP 100 to perform print processing, through near field communication.

The terminal 10 in a first embodiment is structured as a smart phone. The terminal 10 includes a central processing unit (CPU) 11, a flash memory 12, a random-access memory (RAM) 13, operation keys 15, a liquid crystal display (LCD) 16, a touch panel 17, a memory card interface 18, a voice input/output unit 19, a telephone network communication unit 20, a near field communication unit 22, and a wireless communication unit 23. These components are mutually connected through a bus line 24.

The CPU 11 controls the components connected to the bus line 24 according to fixed values, a program, and the like stored in the flash memory 12 or another type of memory. The flash memory 12 is a rewritable non-volatile memory. In the flash memory 12, an operating system (OS) 12a and the device control application 12b are stored. As described below, the CPU 11 that executes an application, the operating system, and other programs may be indicated by a program name. For example, the term "application" may indicate the CPU 11 that executes the application.

The OS 12a is basic software that implements the standard functions of the terminal 10. In the first embodiment, an Android® OS is used as the OS 12a. The device control application 12b, which is an application provided by a vendor of the MFP 100 or another device, is installed in the terminal 10 by the user, after which the user can use the device from the terminal 10. For example, the user can use the print function, the scan function, or another function of the device directly from the terminal 10 without passing through, for example, a personal computer (PC). Each processing indicated in the flowchart in FIG. 2, referenced later, is executed by the CPU 11 according to the device control application 12b. The flash memory 12 includes a print setting memory (not illustrated) in which the size and orientation of paper to be printed and other various print settings are stored.

The RAM 13 is a rewritable volatile memory that has a temporary area, in which various types of data used by the CPU 11 to execute the device control application 12b or the like is temporarily stored. A display flag 13a is set in the RAM 13. The display flag 13a indicates whether guidance 53 (see FIG. 3) is being displayed. Specifically, if the display flag 13a is turned on, it indicates that the guidance 53 is being displayed. The guidance 53 indicates that when the terminal 10 has detected a near field communication (NFC) device, a touch operation input screen 52 (see FIG. 3) displayed by the OS 12a needs an operation (in the first embodiment, a touch operation).

The operation keys 15 can be mechanical keys used to input a command and the like to the terminal 10. The operation keys 15 are provided on, for example, the case of the terminal 10. The LCD 16 displays various screens. The touch panel 17, which is overlaid on the LCD 16, inputs a command and the like to the terminal 10 when the user touches the touch panel 17 with a finger, a rod, or another indicating body or brings it close to the touch panel 17. The memory card interface 18 is an interface in which a rewritable non-volatile memory card MC is mounted. The memory card interface 18 controls the writing and reading of data to and from the memory card MC. The voice input/output unit 19 is a voice input/output device structured with a microphone, a speaker, and the like. The telephone network communication unit 20 is a circuit used for communication through a mobile telephone network (not illustrated).

The near field communication unit 22 is an interface used to perform near field communication, in which communication is possible over a short distance of, for example, about 10 cm. In the first embodiment, near field communication performed by the near field communication unit 22 is non-contact communication complying with the Near Field Communication (NFC) standard (this type of communication will be referred to below as NFC communication). In the first embodiment, the terminal 10 can perform NFC communication to and from the MFP 100 including a near field communication unit 122.

The wireless communication unit 23 is an interface used for wireless communication through a wireless local area network (LAN). In the first embodiment, communication performed by the wireless communication unit 23 is wireless communication through a wireless LAN complying with the IEEE802.11 b/g standard. The terminal 10 can perform wireless communication complying with the Wi-Fi® standard to and from an external apparatus such as the MFP 100 (this type of communication will be referred to below as Wi-Fi communication). The wireless communication unit 23 is wirelessly connected to a wireless communication unit 123 in the MFP 100 in any one of an ad-hoc mode and an infrastructure mode. In the ad-hoc mode, the terminal 10 (specifically, the wireless communication unit 23) and MFP 100 (specifically, the wireless communication unit 123) are wirelessly connected to each other without passing through an access point (not illustrated), which is a relay apparatus. In the infrastructure mode, the terminal 10 and MFP 100 are wirelessly connected to each other with an access point intervening therebetween.

The MFP 100 includes a print function, a scan function, a copy function, a facsimile function, and other various types of functions. To implement these functions, the MFP 100 includes a printer unit, a scanner unit, a facsimile communication unit, and other units (these units are not illustrated). The near field communication unit 122 in the MFP 100 is similar to the near field communication unit 22. The wireless communication unit 123 in the MFP 100 is also similar to the wireless communication unit 23.

Figure 2:
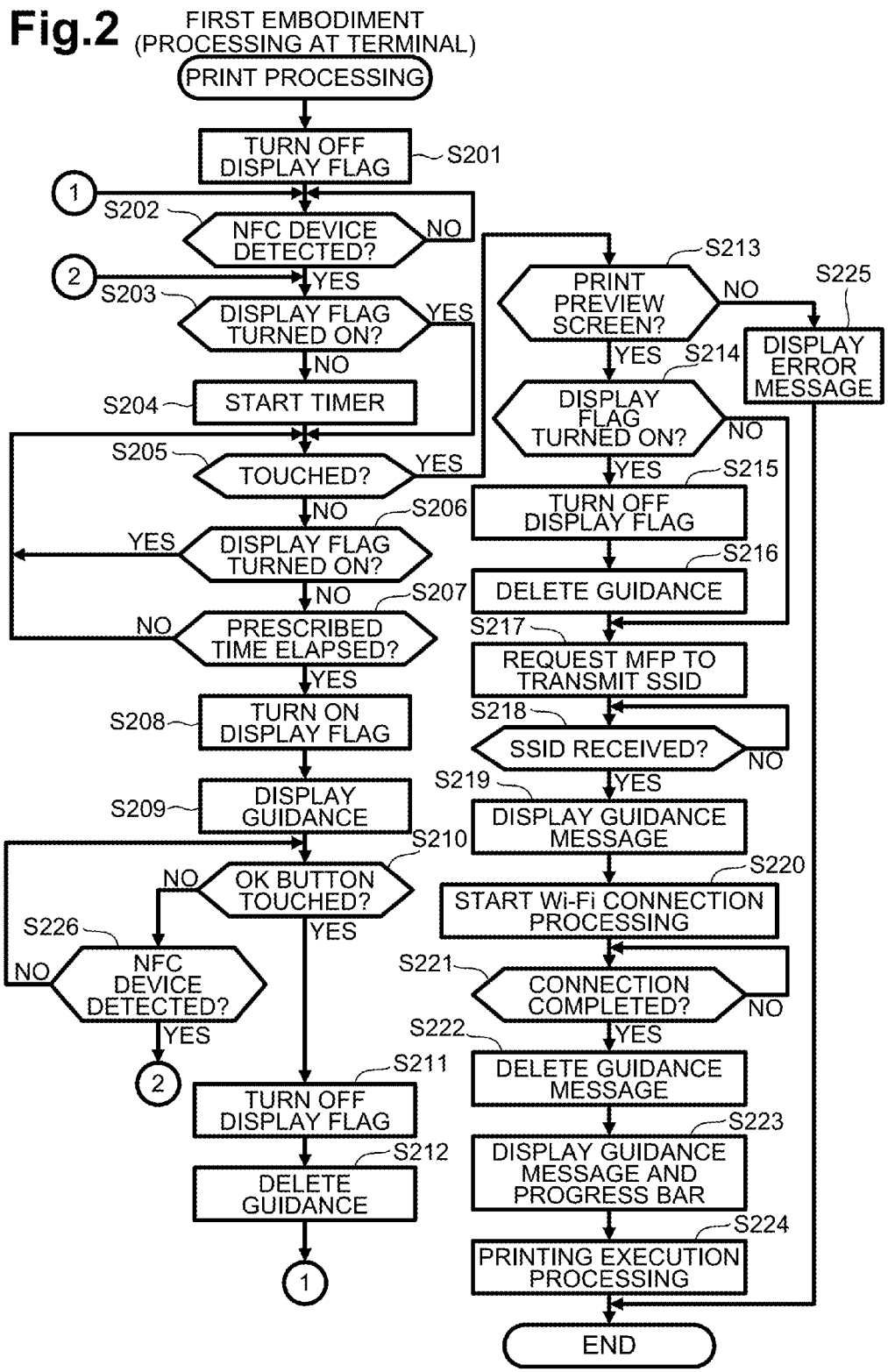
FIG. 2 is a flowchart illustrating print processing in a first embodiment according to aspects of the disclosure.

FIG. 2 is a flowchart illustrating print processing in the first embodiment, which is executed by the CPU 11 in the terminal 10 according to the device control application 12b. In this processing, data used for printing is transmitted to the MFP 100 to cause the print function of the MFP 100 to perform printing according to the data. When the device control application 12b is activated and data eligible for printing is selected, this processing is started. When this processing is started, the CPU 11 turns off the display flag 13a (S201). The CPU 11 determines whether an NFC device, which will become a remote device in NFC communication, has been detected (S202). The NFC device can execute NFC communication such as with the terminal 10. The MFP 100 including the near field communication unit 122 is an example of the NFC device.

Specifically, in S202, the CPU 11 determines whether an NFC device has been detected in a state in which no NFC had been detected according to an event of which the device control application 12b has been notified by the OS 12a. To be more specific, the OS 12a notifies the device control application 12b of an NFC event that is generated in accordance with the terminal 10 (specifically, the near field communication unit 22) having detected an NFC device. If the device control application 12b acquires the NFC event of which the device control application 12b has been notified by the OS 12a, the CPU 11 determines in S202 that an NFC device has been detected.

The CPU 11 repeatedly makes a determination in S202 until the CPU 11 determines that an NFC device has been detected (while the result in S202 is No). If the CPU 11 determines that an NFC device has been detected (the result in S202 is Yes) and the display flag 13a is not turned on (the result in S203 is No), the CPU 11 starts a timer (not illustrated) built into the CPU 11 to measure time (S204). The CPU 11 then causes the sequence to proceed to S205. If the display flag 13a is turned on (the result in S203 is Yes), the CPU 11 skips processing in S204 and causes the sequence to proceed to S205. Accordingly, if the display flag 13a is turned on, that is, the guidance 53 (see FIG. 3) is being displayed, the timer is not started.

In S205, the CPU 11 determines whether the touch operation input screen 52 (see FIG. 3) has been touched according to an event of which the device control application 12b has been notified by the OS 12a. To be more specific, the OS 12a notifies the device control application 12b of a touch event that is generated in accordance with the touch panel 17 having detected a touch operation performed on the touch operation input screen 52. If the device control application 12b acquires the touch event of which the device control application 12b has been notified by the OS 12a, the CPU 11 determines in S205 that a touch operation has been performed on the touch operation input screen 52.

The touch operation input screen 52 is displayed by the OS 12a as the topmost screen (foreground screen) on the LCD 16 in accordance with the terminal 10 having detected an NFC device. When the touch operation input screen 52 is displayed, therefore, a screen 61 (see FIG. 3) that was being displayed by the device control application 12b at a time when the terminal 10 detected the NFC device is displayed in the background (the screen 61 will be referred to below as the immediately before detection screen 61). In this description, a display in the background indicates that display processing is being performed in the background to bring the display on the LCD 16 and the display is not yet drawn on the LCD 16. The device control application 12*b* executes processing to cause the MFP 100 to print an image according to the data eligible for printing (in the first embodiment, processing in S213 to S225 described later) under the condition that the user has touched the touch operation input screen 52.

If the CPU 11 determines that the touch operation input screen 52 has not been touched (the result in S205 is No) and the display flag 13*a* is turned on (the result in S206 is Yes), the CPU 11 causes the sequence to return to S205. If the display flag 13*a* is not turned on (the result in S206 is No), the CPU 11 determines in S207 whether a prescribed time (10 seconds, for example) has elapsed from the start of time measurement in S204. If the CPU 11 determines that the prescribed time has not yet elapsed (the result in S207 is No), the CPU 11 causes the sequence to return to S205. If the CPU 11 determines that the prescribed time has elapsed (the result in S207 is Yes), the CPU 11 turns on the display flag 13*a* (S208) and displays the guidance 53 (S209). In processing in S202 to S209, if the user does not touch the touch operation input screen 52 in a state in which the guidance 53 is not being displayed from when the terminal 10 detects an NFC device until the prescribed time elapses, the guidance 53 is displayed.

Specifically, in S209, the CPU 11 displays the guidance 53 at the front of the immediately before detection screen 61 as a pop-up display. If the guidance 53 is displayed in a state in which the touch operation input screen 52 is not being displayed, the user can immediately view the guidance 53. That is, when the terminal 10 no longer detects an NFC device, the OS 12*a* deletes the touch operation input screen 52, so if the CPU 11 performs processing in S209 after the touch operation input screen 52 has been deleted because, for example, the user had moved the terminal 10 away from the NFC device, the user can immediately view the guidance 53.

If the guidance 53 is displayed in a state in which the touch operation input screen 52 is being displayed as the topmost screen, the touch operation input screen 52 is displayed in the foreground and the guidance 53 is displayed in the background. Since the guidance 53 is displayed on the front of the immediately before detection screen 61 in the background at this time, when the terminal 10 no longer detects an NFC device, the OS 12*a* deletes the touch operation input screen 52 and the guidance 53 is then displayed as the topmost screen. If the CPU 11 executes processing in S209 while the distance between the terminal 10 and the NFC device is maintained at the NFC communication enabled distance or shorter, the user can view the guidance 53 only after the distance between the terminal 10 and the NFC device becomes longer than the NFC communication enabled distance.

According to the device control application 12*b* in the first embodiment, processing in S209 is not executed while the display flag 13*a* is turned on, that is, the guidance 53 is already displayed. Therefore, more than one pop-up display of the guidance 53 is not displayed, so it is possible to suppress increases in processing load on the CPU 11 and an amount by which the RAM 13 is consumed and to suppress discomfort due to multiple displays from being given to the user.

After processing in S209, the CPU 11 determines whether an OK button 53*a* displayed together with the guidance 53 has been touched, according to the event of which the device control application 12*b* has been notified by the OS 12*a* (S210). If the CPU 11 determines that the OK button 53*a* has been touched (the result in S210 is Yes), the CPU 11 turns off the display flag 13*a* (S211) and deletes the guidance 53 (S212). The OK button 53*a* can be touched only while the guidance 53 is being displayed on the LCD 16 as the topmost display, that is, the touch operation input screen 52 is not being displayed. Then, since the guidance 53 has been deleted, the immediately before detection screen 61 is displayed on the LCD 16 as the topmost screen. After processing in S212, the CPU 11 causes the sequence to return to S202.

If the CPU 11 determines that the OK button 53*a* has not been touched (the result in S210 is No), the CPU 11 determines whether an NFC device, which will become a remote device in NFC communication, has been detected as in S202 (S226). If the CPU 11 determines that an NFC device has not been detected (the result in S226 is No), the CPU 11 causes the sequence to return to S210. If the CPU 11 determines that an NFC device has been detected (the result in S226 is Yes), the CPU 11 causes the sequence to return to S203. Specifically, the terminal 10 is placed in a state in which it cannot detect an NFC device while the guidance 53 remains displayed, after which if the terminal 10 detects an NFC device again, the CPU 11 causes the sequence to proceed to S203. Then, if the display flag 13*a* is turned on, the CPU 11 executes processing in S203 and later steps.

If the CPU 11 determines in S205 that the touch operation input screen 52 has been touched (the result in S205 is Yes), the CPU 11 determines whether the immediately before detection screen 61, that is, the screen that was being displayed by the device control application 12*b* at a time when the terminal 10 detected the NFC device is a print preview screen 51 (see FIG. 3) (S213). The print preview screen 51 displays a print preview image according to the data eligible for printing. The device control application 12*b* in the first embodiment can command the MFP 100 to print an image according to the data eligible for printing under the condition that the print preview screen 51 is being displayed. That is, in the first embodiment, the print preview screen 51 is used to cause the MFP 100 to perform its print function (print processing).

If the CPU 11 determines in S213 that the immediately before detection screen 61 is not the print preview screen 51, that is, for example, a screen used to change a print setting or another screen is displayed, (the result in S213 is No), the CPU 11 displays an error message (not illustrated) indicating that the immediately before detection screen 61 is not displayed (S225) and terminates the sequence. If the CPU 11 determines in S213 that the immediately before detection screen 61 is the print preview screen 51 (the result in S213 is Yes), the CPU 11 determines whether the display flag 13*a* is turned on (S214). If the CPU 11 determines that the display flag 13*a* is turned on (the result in S214 is Yes), the CPU 11 turns off the display flag 13*a* (S215), deletes the guidance 53 (S216), and causes the sequence to proceed to S217. If the CPU 11 determines that the display flag 13*a* is turned on (the result in S214 is No), the CPU 11 skips processing in S215 and S216 and causes the sequence to proceed to S217. Even if the guidance 53 was being displayed in the background at a time when the touch operation input screen 52 was touched, the guidance 53 is deleted, therefore, it is possible to cause the MFP 100 to print an image displayed on the print preview screen 51, regardless of whether the guidance 53 was being displayed at a time when the touch operation was performed.

In S217, the CPU 11 requests the MFP 100, which is an NFC device, to transmit a service set identifier (SSID), which is used to establish a wireless connection with the MFP 100 in the ad-hoc mode, through NFC communication (S217). Upon receipt of the request, the MFP 100 issues a so-called one-time SSID and transmits the issued SSID to the terminal 10 through NFC communication. After processing in S217, the CPU 11 waits until the SSID is received from the MFP 100 (while the result in S218 is No). In view of a case in which the remote NFC device in NFC communication is not the MFP 100, if the CPU 11 cannot receive an SSID within a predetermined time (10 seconds, for example) after processing in S217 has been executed, the CPU 11 may terminate the sequence.

If the CPU 11 receives the SSID (the result in S218 is Yes) from the MFP 100, the CPU 11 displays guidance message Ma (see FIG. 3) informing the user that the terminal 10 may be moved away from the MFP 100 (NFC device) (S219). Specifically, in S219, the CPU 11 displays the guidance message Ma on the front of the print preview screen 51 (immediately before detection screen 61) as a pop-up display. Therefore, the user views the guidance message 54a and learns that there is no need to continue NFC communication between the terminal 10 and the MFP 100, that is, the terminal 10 does not need to remain close to the MFP 100.

Next, the CPU 11 starts Wi-Fi connection processing to establish a wireless connection between the wireless communication unit 23 and the wireless communication unit 123 in the MFP 100 in the ad-hoc mode (S220). Specifically, to establish a Wi-Fi wireless connection, the CPU 11 sets the SSID received from the MFP 100 as a wireless setting used to perform Wi-Fi communication through the wireless communication unit 23. After starting the Wi-Fi connection processing in S220, the CPU 11 waits until a Wi-Fi wireless connection is completed (while the result in S221 is No). If the CPU 11 determines that a Wi-Fi wireless connection is completed (the result in S221 is Yes), the CPU 11 deletes the guidance message 54a displayed in S219 (S222). If, in S221, the CPU 11 transmits, for example, an inquiry to the MFP 100 identified by the set SSID and receives a reply to the inquiry, the CPU 11 determines that a Wi-Fi wireless connection is completed.

The CPU 11 displays the guidance message 54b and a progress bar 55 (see FIG. 3) (S223) Like the guidance message 54a, the guidance message 54b informs the user that the terminal 10 may be moved away from the MFP 100. In S223, the CPU 11 displays the guidance message 54b and progress bar 55 on the front of the print preview screen 51 as pop-up displays. Even if the guidance message 54a is deleted, therefore, the guidance message 54b remains displayed.

Next, the CPU 11 executes printing execution processing (S224) and terminates the sequence. Specifically, in printing execution processing in S224, the CPU 11 transmits a print command and print data to the MFP 100, which is a connection destination in Wi-Fi connection processing in S220, in Wi-Fi communication performed in the ad-hoc mode through the wireless communication unit 23. In the first embodiment, data used for printing includes data eligible for printing and print settings stored in the flash memory 12. Alternatively, the CPU 11 may create print data from data eligible for printing and print settings and may transmit the created print data to the MFP 100 as data used for printing.

The progress bar 55 displayed in S223 indicates the progress of transmission of the data used for printing to the MFP 100. The progress bar 55 and guidance message 54b displayed in S223 are deleted when printing execution processing in S224 is terminated. A time taken to transmit the data used for printing to the MFP 100 is adequately longer than a time taken from when Wi-Fi connection processing described above starts until it is terminated. Accordingly, the user can view the guidance message 54b displayed in S223 for a relatively long time, so the user can more easily learn that the terminal 10 does not need to remain close to the MFP 100.

Figure 3:
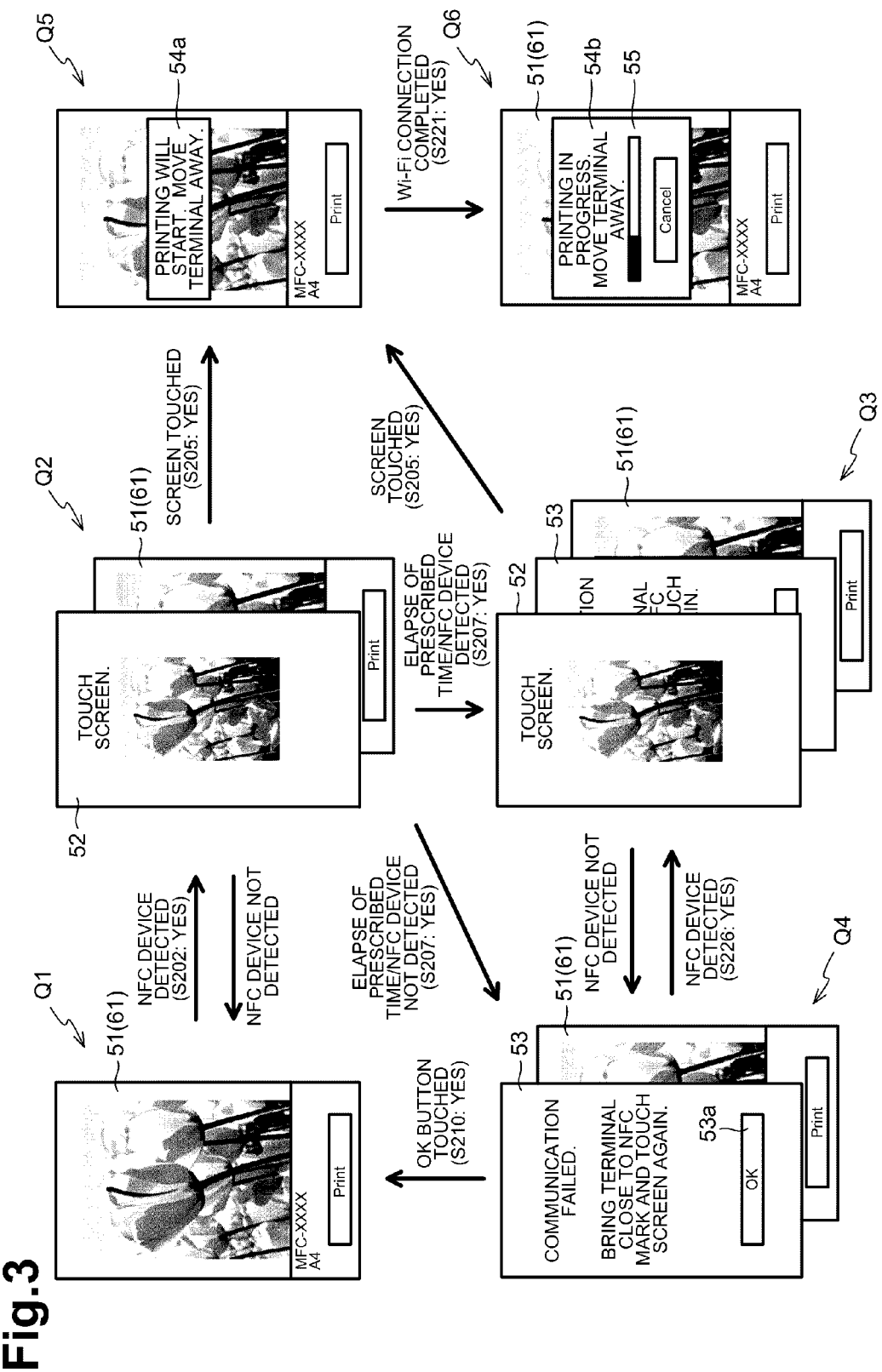
FIG. 3 schematically illustrates an example of screen transition in the first embodiment according to aspects of the disclosure.

FIG. 3 schematically illustrates an example of transitions of the screens displayed on the LCD 16 in the first embodiment. Display Q1 is the print preview screen 51 displayed by the device control application 12b. If the terminal 10 is brought close to an NFC device while display Q1 is being displayed on the LCD 16 and the terminal 10 detects the NFC device as a new one, the OS 12a displays the touch operation input screen 52 as the topmost screen, that is, displays the touch operation input screen 52 on the front of the print preview screen 51, which is the immediately before detection screen 61. As a result, the display on the LCD 16 changes from display Q1 to display Q2. That is, if the CPU 11 produces a Yes result in S202 in FIG. 2, display Q2 is displayed on the LCD 16. On display Q2, the print preview screen 51 is displayed in the background as a result of the touch operation input screen 52 being displayed. In FIG. 3 and FIGS. 5 and 7, which will be referenced later, a display in the background is illustrated so that the topmost display overlaps the display for convenience. In practice, however, only the topmost display is drawn on the LCD 16 and each display in the background is not drawn on the LCD 16. That is, on the LCD 16, the user can view only the topmost display. If the terminal 10 is moved away from the NFC device while display Q2 is being displayed on the LCD 16 and the terminal 10 no longer detects an NFC device, the OS 12a deletes the touch operation input screen 52. As a result, the display on the LCD 16 changes from display Q2 to display Q1.

When a predetermined time (10 seconds, for example) elapses after the display on the LCD 16 has changed from display Q1 to display Q2, the device control application 12b displays the guidance 53 on the front of the print preview screen 51. If an NFC device is being detected by the terminal 10 at a time when the guidance 53 is displayed, the display on the LCD 16 changes from display Q2 to display Q3. That is, the touch operation input screen 52 is displayed on the LCD 16 as the topmost screen and the guidance 53 is displayed on the front of the print preview screen 51 in the background. If an NFC device is not being detected by the terminal 10 at a time when the guidance 53 is displayed, the display on the LCD 16 changes from display Q2 to display Q4. That is, the guidance 53 is displayed on the LCD 16 as the topmost display. If the CPU 11 produces a Yes result in S207 in FIG. 2, therefore, display Q3 or display Q4 is displayed on the LCD 16 depending on whether an NFC device is being detected by the terminal 10. If the terminal 10 no longer detects an NFC device while display Q3 is being displayed on the LCD 16, the OS 12a deletes the touch operation input screen 52. As a result, the display on the LCD 16 changes from display Q3 to display Q4.

If the OK button 53a, which is displayed together with the guidance 53, is touched while display Q4 is being displayed on the LCD 16, the device control application 12b deletes the guidance 53. As a result, the display on the LCD 16 changes from display Q4 to display Q1. If the CPU 11 produces a Yes result in S210 in FIG. 2, therefore, display Q1 is displayed on the LCD 16. If the terminal 10 detects an NFC device while display Q4 is being displayed on the LCD 16, the OS 12a displays the touch operation input screen 52 as the topmost screen. As a result, the display on the LCD 16 changes from display Q4 to display Q3. If the CPU 11 produces a Yes result in S226 in FIG. 2, therefore, display Q3 is displayed on the LCD 16. Since the guidance 53 is being displayed before the terminal 10 detects an NFC device, even if 10 seconds elapses after the display on the LCD 16 has changed from display Q4 to display Q3, the guidance 53 is not additionally displayed.

If the touch operation input screen 52 is touched while display Q2 or display Q3 is being displayed on the LCD 16, that is, the touch operation input screen 52 is being displayed as the topmost screen, the OS 12a deletes the touch operation input screen 52 under the condition that the print preview screen 51 is being displayed, after which the device control application 12b displays the guidance message 54a under the condition that the terminal 10 has received the SSID from the MFP 100. If display Q3 is being displayed, the guidance 53 is also deleted. As a result, the display on the LCD 16 changes from display Q2 or display Q3 to display Q5. If the CPU 11 produces a Yes result in S205 in FIG. 2, therefore, display Q5 is displayed on the LCD 16 if the print preview screen 51 is being displayed, regardless of whether the guidance 53 is being displayed. If the touch operation input screen 52 is touched, the device control application 12b does not receive a touch made on the print preview screen 51.

If the Wi-Fi wireless connection between the terminal 10 and the MFP 100, which is an NFC device, is completed while display Q5 is being displayed on the LCD 16, the device control application 12b deletes the guidance message 54a and displays the guidance message 54b and progress bar 55. As a result, the display on the LCD 16 changes from display Q5 to display Q6. If the CPU 11 produces a Yes result in S221 in FIG. 2, therefore, display Q6 is displayed on the LCD 16.

In the first embodiment described so far, if the user does not touch the touch operation input screen 52 within a prescribed time after the terminal 10 has detected an NFC device, the guidance 53 is displayed, so the user can learn an operation that should be performed on the touch operation input screen 52 according to the displayed guidance 53. When the user uses the print function of the MFP 100 through NFC communication, therefore, it is possible to suppress a situation in which the user cannot execute the print function, so the terminal 10 is superior in convenience. Since a time elapsed after the terminal 10 has detected the NFC device is used as a condition under which the guidance 53 is displayed, it is also possible to suppress a situation in which the user cannot use the print function for a long time after the terminal 10 has detected the NFC device.

A second embodiment will be described below with reference to FIGS. 4 and 5. In the first embodiment, the guidance 53 has been displayed under the condition that the user does not touch the touch operation input screen 52 within a prescribed time after the terminal 10 has detected an NFC device. In the second embodiment, however, the guidance 53 is displayed under the condition that the touch operation input screen 52 is deleted because the terminal 10 no longer detects an NFC device. In the second embodiment, elements that are the same as in the first embodiment will be given the same reference characters, and repeated descriptions will be omitted. Differences from print processing (see FIG. 2) in the first embodiment above will be mainly described.

FIG. 4 is a flowchart illustrating print processing in a second embodiment. Print processing in the second embodiment is also executed by the CPU 11 in the terminal 10 according to the device control application 12b. As in the first embodiment, when the device control application 12b is activated and data eligible for printing is selected, print processing is started. In the second embodiment, if the CPU 11 determines in S202 that an NFC device has been detected (the result in S202 is Yes), the CPU 11 determines whether a resume event has been acquired from the OS 12a (S401). The resume event is generated when the screen displayed on the LCD 16 as the topmost screen is changed from a screen displayed by the OS 12a back to a screen displayed by an application (in the second embodiment, the device control application 12b). If the OS 12a deletes the touch operation input screen 52, the OS 12a notifies the device control application 12b of a resume event that has been generated at a time of deletion of the touch operation input screen 52. If the screen displayed on the LCD 16 as the topmost screen has changed from the touch operation input screen 52 to the immediately before detection screen 61, the CPU 11 produces a Yes result in S401.

The CPU 11 repeatedly makes a decision in S401 until the CPU 11 determines that a resume event has been acquired (while the result in S404 is No). If the CPU 11 determines that a resume event has been acquired (the result in S401 is Yes), the CPU 11 determines whether the acquired resume event has been generated due to a touch operation on the touch operation input screen 52 (S402). If the CPU 11 acquires, from the OS 12a, a touch event generated as a result of the touch panel 17 having detected a touch operation on the touch operation input screen 52 as an event corresponding to the resume event, the CPU 11 determines in S402 that the resume event has been generated due to a touch operation on the touch operation input screen 52. If the CPU 11 acquires, from the OS 12a, an event indicating that the terminal 10 no longer detects an NFC device as an event corresponding to the resume event or acquires a resume event without acquiring a touch event on the touch operation input screen 52 from the OS 12a, the CPU 11 determines in S402 that the resume event has not been generated due to a touch operation on the touch operation input screen 52.

If the CPU 11 determines in S402 that the resume event has been generated due to a touch operation on the touch operation input screen 52 (the result in S402 is Yes), the CPU 11 causes the sequence to proceed to S213. If the CPU 11 determines in S402 that the resume event has not been generated due to a touch operation on the touch operation input screen 52 (the result in S402 is No), the CPU 11 determines whether the immediately before detection screen 61 displayed on the LCD 16 as the topmost screen due to the deletion of the touch operation input screen 52 is the print preview screen 51 (S403). If the CPU 11 determines that the immediately before detection screen 61 is not the print preview screen 51 (the result in S403 is No), the CPU 11 displays an error message (not illustrated) (S225) and terminates the sequence.

If the CPU 11 determines that the immediately before detection screen 61 is the print preview screen 51 (the result in S403 is Yes), the CPU 11 determines whether the display flag 13a is turned on (S404). If the CPU 11 determines that the display flag 13a is not turned on (the result in S404 is No), the CPU 11 turns on the display flag 13a (S208), displays the guidance 53 (S209), and causes the sequence to proceed to S210. If the CPU 11 determines that the display flag 13a is turned on (the result in S404 is Yes), the CPU 11 skips processing in S208 and S209 and causes the sequence to proceed to S210. In the second embodiment as well, therefore, more than one pop-up display of the guidance 53 is not displayed as in the first embodiment.

FIG. 5 schematically illustrates an example of transition of screens displayed on the LCD 16 in the second embodiment. If the terminal 10 no longer detects an NFC device while display Q2 or display Q3 is being displayed on the LCD 16 as illustrated in FIG. 5, the device control application 12b acquires a resume event from the OS 12a due to the non-detection of an NFC device. Then, the display on the LCD 16 changes from display Q2 or display Q3 to display Q4. If the CPU 11 produces a No result in S402 in FIG. 4, therefore, display Q4 is displayed on the LCD 16. Thus, in the second embodiment, when the guidance 53 is displayed, the user can view the guidance 53 as the topmost display.

If the touch operation input screen 52 is touched while display Q2 or display Q3 is being displayed on the LCD 16, the device control application 12b acquires a resume event from the OS 12a due to the touch operation on the touch operation input screen 52. Then, the display on the LCD 16 changes from display Q2 or display Q3 to display Q5. If the CPU 11 produces a Yes result in S402 in FIG. 4, therefore, display Q5 is displayed on the LCD 16.

In the second embodiment described so far, at a time when the terminal 10 no longer detects an NFC device, the user can learn an operation (in the second embodiment, a touch operation) that she should have performed on the touch operation input screen 52. Particularly, a requirement that the immediately before detection screen 61 that was being displayed by the device control application 12b at a time when the terminal 10 detected an NFC device be the print preview screen 51 is included as one of the conditions to display the guidance 53, so if the user touches the touch operation input screen 52 after that, the print preview screen 51 is highly likely to be displayed in the background. Accordingly, it is possible to suppress an error, increasing convenience when the user uses the print function of the MFP 100.

Next, a third embodiment will be described with reference to FIGS. 6 and 7. In the third embodiment, the guidance 53 is displayed under the condition that the print preview screen 51 is being displayed at a time when the terminal 10 detects a new NFC device. In the third embodiment, elements that are the same as in the first embodiment will be given the same reference characters. Differences from print processing (see FIG. 2) in the first embodiment above will be mainly described.

FIG. 6 is a flowchart illustrating print processing in the third embodiment. Print processing in the third embodiment is also processing executed by the CPU 11 in the terminal 10 according to the device control application 12b. Print processing starts when the device control application 12b is activated and data eligible for printing is selected, as in the first embodiment. In the third embodiment, if the CPU 11 determines in S202 that an NFC device has been detected (the result in S202 is Yes), the CPU 11 determines whether the topmost screen (immediately before detection screen 61) displayed on the LCD 16 is the print preview screen 51 (S601). If the CPU 11 determines that the immediately before detection screen 61 is not the print preview screen 51 (the result in S601 is No), the CPU 11 displays an error message (not illustrated) (S225) and terminates the sequence.

If the CPU 11 determines that the immediately before detection screen 61 is the print preview screen 51 (the result in S601 is Yes), the CPU 11 determines whether the display flag 13a is turned on (S602). If the CPU 11 determines that the display flag 13a is not turned on (the result in S602 is No), the CPU 11 turns on the display flag 13a (S208), displays guidance 53 (S209), and executes processing in S205 as in the first embodiment. If the CPU 11 determines that the display flag 13a is turned on (the result in S602 is Yes), the CPU 11 skips processing in S208 and S209 and causes the sequence to proceed to S205. In the third embodiment as well, therefore, more than one pop-up display of the guidance 53 is not displayed as in the first embodiment. If the CPU 11 determines in S205 that the touch operation input screen 52 has not been touched (the result in S205 is No), the CPU 11 causes the sequence to proceed to S210. If the CPU 11 determines that the touch operation input screen 52 has been touched (the result in S205 is Yes), the CPU 11 causes the sequence to proceed to S214.

FIG. 7 schematically illustrates an example of transition of screens displayed on the LCD 16 in the third embodiment. When the terminal 10 is brought close to an NFC device and detects the NFC device as a new one as illustrated in FIG. 7, if the display on the LCD 16 is display Q1, that is, the print preview screen 51, the device control application 12b displays the guidance 53 at the front of the print preview screen 51. Since the OS 12a displays the touch operation input screen 52 on the LCD 16 as the topmost screen when the terminal 10 detects a new NFC device, the print preview screen 51 and guidance 53 displayed by the device control application 12b are displayed in the background. Therefore, the display on the LCD 16 changes from display Q1 to display Q3. If the CPU 11 produces a Yes result in S601 in FIG. 6, display Q3 is displayed on the LCD 16.

In the third embodiment described so far, the guidance 53 is displayed at a time when the terminal 10 detects a new NFC device under the condition that the print preview screen 51 is being displayed by the device control application 12b as the immediately before detection screen 61. If the user touches the touch operation input screen 52 after that, therefore, the print preview screen 51 is highly likely to be displayed in the background, so it is possible to suppress an error, increasing convenience when the user uses the print function of the MFP 100.

Next, a fourth embodiment will be described with reference to FIG. 8. In the first embodiment above, it has been described that time measurement by a timer (not illustrated) is started when the terminal 10 detects an NFC device under the condition that the display flag 13a is not turned on, that is, the guidance 53 is not displayed. In the fourth embodiment, however, time measurement by a timer is started when the terminal 10 detects an NFC device regardless of whether the guidance 53 is being displayed. In the fourth embodiment, elements that are the same as in the first embodiment will be given the same reference characters, and repeated descriptions will be omitted. Differences from print processing (see FIG. 2) in the first embodiment above will be mainly described.

FIG. 8 is a flowchart illustrating print processing in the fourth embodiment. Print processing in the fourth embodiment is also processing executed by the CPU 11 in the terminal 10 according to the device control application 12b. Print processing starts when the device control application 12b is activated and data eligible for printing is selected, as in the first embodiment. In the fourth embodiment, if the CPU 11 determines in S202 that an NFC device has been detected (the result in S202 is Yes), the CPU 11 executes processing in S204 to start time measurement by a timer. If the CPU 11 determines that the touch operation input screen 52 has not been touched (the result in S205 is No), the CPU 11 determines whether a prescribed time (10 seconds, for example) has elapsed from the start of time measurement in S204 (S207). If the CPU 11 determines that the prescribed time has not yet elapsed (the result in S207 is No), the CPU 11 causes the sequence to return to S205.

If the CPU 11 determines that the prescribed time has elapsed (the result in S207 is Yes), the CPU 11 determines whether the display flag 13a is turned on (S801). If the CPU 11 determines that the display flag 13a is not turned on (the result in S801 is No), the CPU 11 turns on the display flag 13a (S208), displays guidance 53 (S209), and causes the sequence to proceed to S210. If the CPU 11 determines that the display flag 13a is turned on (the result in S801 is Yes), the CPU 11 skips processing in S208 and S209 and causes the sequence to proceed to S210.

In each embodiment described so far, the device control application 12b is an example of a display program. The terminal 10 is an example of a display apparatus. The MPF 100 is an example of an external apparatus. The near field communication unit 22 is an example of a first communication unit of a communication unit. The wireless communication unit 23 is an example of a second communication unit of the communication unit. The LCD 16 is an example of a display unit. The CPU 11 is an example of a control unit. The OS 12a is an example of a second program, which is an operating system. NFC communication is an example of near field communication. Wi-Fi communication is an example of wireless communication different from the near field communication. The touch operation input screen 52 is an example of a specific screen. The guidance 53 is an example of a prescribed message. The print preview screen 51 is an example of a screen on which prescribed processing is performed by the external apparatus. The guidance messages 54a and 54b are examples of messages involved in termination of communication with the external apparatus connected through the first communication unit. The progress bar 55 is an example of information indicating the progress of image data communication. The CPU 11 that executes processing in S207, S402, S403, and S601 is an example of a condition determining means. The CPU 11 that executes processing in S209 is an example of a first message displaying means. The CPU 11 that executes processing in S204 is an example of a time measuring means. The CPU 11 that executes processing in S205 is an example of an operation deciding means. The CPU 11 that executes processing in S224 is an example of a command output means and a data communication means. The CPU 11 that executes processing in S218 is an example of a setting receiving means. The CPU 11 that executes processing in S219 is an example of a second message displaying means. The CPU 11 that executes processing in S221 is an example of a communication setting means. The CPU 11 that executes processing in S223 is an example of a third message displaying means.

The present invention has been described so far according to the embodiments, but the present invention is not limited to the above embodiments. It will be easily appreciated that various improvements and modifications are possible without departing from the intended scope of the present invention.

In each embodiment described so far, for example, the terminal 10 such as a smart phone has been exemplified as a display apparatus in which the device control application 12b is installed, but various apparatus can be used as the display apparatus if they can perform NFC communication and Wi-Fi communication as necessary. If a tablet terminal, a notebook personal computer, a digital camera, a music reproducing apparatus, and other types of apparatuses can perform NFC communication and Wi-Fi communication as necessary, they can be used as a display apparatus in which to install the device control application 12b. In each embodiment described so far, the OS 12a in the terminal 10 has been described as being an Android® OS, but another OS may be used.

In each embodiment described so far, the present invention has been applied to a case in which the terminal 10 uses the print function of the MFP 100. However, if the terminal 10 detects an NFC device, the OS 12a displays the touch operation input screen 52 independently of the function used by the MFP 100, so the present invention can also be applied to a case in which the terminal 10 uses a function of the MFP 100 other than the print function, such as, for example, the scan function or facsimile function. FIG. 9 illustrates a flowchart of scan processing as an example of this case. Scan processing in FIG. 9 is executed by the CPU 11 in the terminal 10 according to the device control application 12b. In the scan processing, an original is scanned by using the scan function of the MFP 100 to obtain scan data, after which the CPU 11 acquires the obtained scan data from the MFP 100. The scan processing is started when the device control application 12b is activated and the use of the scan function is selected. In this variation, elements that are the same as in the first embodiment will be given the same reference characters, and repeated descriptions will be omitted. Differences from print processing (see FIG. 2) in the first embodiment above will be mainly described.

In the scan processing, the CPU 11 determines whether the immediately before detection screen 61 is a scan main processing (not illustrated) instead of processing in S213, as illustrated in FIG. 9 (S901). The scan main screen is used to cause the terminal 10 to execute the scan function (scan processing). When scan data is received from the MFP 100, an image based on the scan data is displayed on the scan main screen. If the CPU 11 determines that the immediately before detection screen 61 is the scan main screen (the result in S801 is Yes), the CPU 11 executes processing in S203 to S214 as in the first embodiment, after which the CPU 11 executes scan execution processing (S802) and then terminates the sequence. Specifically, in scan execution processing (S802), the CPU 11 transmits a scan command to the MFP 100, which is a connection destination in Wi-Fi connection processing (S220), through Wi-Fi communication in the ad-hoc mode with the wireless communication unit 23 intervening therebetween. When the MFP 100 receives, through the Wi-Fi communication, scan data of the original that the MFP 100 has scanned in response to the scan command, the CPU 11 displays an image based on the scan data on the main scan screen.

In each embodiment described so far, the MFP 100 having a plurality of functions including the print function has been exemplified as an external apparatus. A printer, a scanner, and other special apparatuses having only a single function can also be used as an external apparatus. In each embodiment described so far, Wi-Fi communication between the terminal 10 and the MFP 100 has been described as being carried out in the ad-hoc mode, but Wi-Fi communication may be carried out in the infrastructure mode through an access point (not illustrated). Image data may be transmitted in NFC communication instead of Wi-Fi communication. In this case, the guidance messages 54a and 54b do not need to be displayed. Alternatively, image data may be transmitted in various wireless communication methods such as a Bluetooth® communication method. In each embodiment described so far, NFC communication has been exemplified as a near field communication method, but a near field communication method complying with TransferJet® or another standard may be used.

In each embodiment described so far, the guidance 53 has been displayed in the background while the touch operation input screen 52 has been displayed. However, the guidance 53 may be displayed as the topmost display, that is, at the front of the touch operation input screen 52.

In each embodiment described so far, the guidance message 54a has been deleted at the start of Wi-Fi connection processing under the condition that the terminal 10 has received the SSID from the MFP 100. However, the guidance message 54a may be left displayed until print execution processing (S224) is terminated. In this case, processing in S223 may be executed so that although the progress bar 55 is additionally displayed as a pop-up display, the guidance message 54b is not displayed. Instead of the progress bar 55, the progress of print data transfer may be indicated by a numeric value or another form.

In each embodiment and variation described so far, the CPU 11 has executed processing in FIGS. 2, 4, 6, 8, and 9. However, a plurality of CPUs may execute processing in these drawings in collaboration. Alternatively, a single integrated circuit (IC) such as an application-specific integrated circuit (ASIC) may execute processing in these drawings or a plurality of such ICs may execute processing in these drawings in collaboration. Alternatively, the CPU 11 and an IC such as an ASIC may execute processing in these drawings in collaboration. Features described in the above first to fourth embodiments and the above variations may be appropriately combined.

What is claimed is:

1. A non-transitory computer-readable storage medium storing a computer program that, when executed by a processing unit of a wireless communication device, causes the wireless communication device to perform steps comprising:

displaying, by the wireless communication device, a preview screen of data selected for printing;

detecting an image forming apparatus by way of a short-range communication protocol;

determining that the wireless communication device detects the image forming apparatus by way of the short-range communication protocol, wherein in a state where a transition has occurred from the wireless communication device not detecting the image forming apparatus to the wireless communication device detecting the image forming apparatus, hiding, by a second computer program, the preview screen and displaying an input screen on the wireless communication device, wherein the input screen includes a first prompt for a user to provide a first input to cause the wireless communication device to start communication with the image forming apparatus by a wireless communication protocol;

in response to determining that the wireless communication device no longer detects the image forming apparatus by way of the short-range communication protocol:

hiding the input screen, and displaying a message on the wireless communication device, the message including an operation to be performed by the user using the wireless communication device to reestablish communication between the wireless communication device and the image forming apparatus using the short-range communication protocol;

in response to the first input being received by the wireless communication device when the input screen is displayed after detecting the image forming apparatus by way of the short-range communication protocol, hiding the input screen, redisplaying the preview screen, starting to communicate with the image forming apparatus by the wireless communication protocol, and communicating, by the short-range communication protocol and the wireless communication protocol different from the short-range communication protocol, with the image forming apparatus to enable the image forming apparatus to execute a printing function, the communicating including transmitting image data from the wireless communication device to the image forming apparatus using the wireless communication protocol different from the short-range communication protocol, starting a timer in a state that the second computer program has caused the input screen to be displayed on the wireless communication device and prior to the image forming apparatus executing the printing function, the input screen being displayed based on the wireless communication device detecting the image forming apparatus using the short-range communication protocol; and in response to the timer having elapsed, displaying the message on the wireless communication device regarding communication between the wireless communication device and the image forming apparatus using the short-range communication protocol.

2. The non-transitory computer-readable storage medium according to claim 1, wherein the step of communicating with the image forming apparatus includes receiving setting information for the wireless communication protocol from the image forming apparatus using the short-range communication protocol, wherein the computer program, when executed by the processing unit, further causes the wireless communication device to perform a step comprising:

displaying a message related to terminating communication with the image forming apparatus using the short-range communication protocol in response to receiving the setting information.

3. The non-transitory computer-readable storage medium according to claim 2, wherein the step of communicating with the image forming apparatus includes enabling communication with the image forming apparatus to be performed using the wireless communication protocol based on the received setting information; and transmitting image data from the wireless communication device to the image forming apparatus using the wireless communication protocol.

4. The non-transitory computer-readable storage medium according to claim 3, wherein the step of displaying the message related to terminating communication includes displaying a message indicating progress of transmitting the image data while the image data is being transmitted.

5. The non-transitory computer-readable storage medium according to claim 1, wherein the message further includes a second prompt for the user to provide a second input to the wireless communication device in addition to the operation to be performed; and wherein the computer program, when executed by the processing unit, further performs steps comprising:

receiving the second input to the wireless communication device from the user; and displaying the preview screen in response to receiving the second input.

6. The non-transitory computer-readable storage medium according to claim 1, wherein the computer program, when executed by the processing unit, further performs steps comprising:
displaying the preview screen on the wireless communication device prior to determining that the image forming apparatus is detected by the wireless communication device by way of the short-range communication protocol; and
determining if the preview screen contains data selected for printing in response to the first input being received by the wireless communication device when the input screen is displayed,
wherein the step of communicating with the image forming apparatus is only executed when the preview screen is determined to contain data selected for printing.

7. The non-transitory computer-readable storage medium according to claim 1, wherein the message regarding communication between the wireless communication device and the image forming apparatus using the short-range communication protocol indicates an operation to be performed using the wireless communication device.

8. The non-transitory computer-readable storage medium according to claim 1, wherein the message regarding communication between the wireless communication device and the image forming apparatus using the short-range communication protocol further includes a second prompt for the user to provide a second input to the wireless communication device in addition to the operation to be performed; and
wherein the computer program, when executed by the processing unit, further performs steps comprising:
receiving the second input to the wireless communication device from the user; and
displaying the preview screen responsive to receiving the second input.

9. The non-transitory computer-readable storage medium according to claim 1, wherein the step of communicating with the image forming apparatus includes receiving setting information for the wireless communication protocol from the image forming apparatus using the short-range communication protocol, wherein the computer program, when executed by the processing unit, further performs a step comprising: displaying a message related to terminating communication with the image forming apparatus using the short-range communication protocol in response to receiving the setting information.

10. The non-transitory computer-readable storage medium according to claim 9, wherein the step of communicating with the image forming apparatus includes
enabling communication with the image forming apparatus to be performed using the wireless communication protocol based on the received setting information; and
transmitting image data from the wireless communication device to the image forming apparatus using the wireless communication protocol.

11. The non-transitory computer-readable storage medium according to claim 10, wherein the step of displaying the message related to terminating communication includes displaying a message indicating progress of transmitting the image data while the image data is being transmitted.

12. The non-transitory computer-readable storage medium according to claim 1, wherein the step of communicating includes transmitting image data from the wireless communication device to the image forming apparatus using the wireless communication protocol different from the short-range communication protocol.

13. The non-transitory computer-readable storage medium according to claim 1, wherein the computer program, when executed by the processing unit, further causes the wireless communication device to perform steps comprising:
displaying the preview screen on the wireless communication device prior to starting the timer; and
determining if the preview screen contains data selected for printing in response to the input being received by the wireless communication device when the input screen is displayed, wherein the step of communicating with the image forming apparatus is only executed when the preview screen is determined to contain data selected for printing.

14. A wireless communication device comprising:
a display;
a communication interface device configured to communicate with an image forming apparatus using a short-range communication protocol; and
at least one processor; and
a memory storing a computer-readable program that, when executed by the at least one processor, causes the wireless communication device to perform steps comprising:
displaying a preview screen of data selected for printing;
determining that the wireless communication device detects the image forming apparatus by way of the short-range communication protocol, wherein in a state where a transition has occurred from the wireless communication device not detecting the image forming apparatus to the wireless communication device detecting the image forming apparatus hiding, by a second computer program, the preview screen and displaying an input screen on the display, wherein the input screen includes a first prompt for a user to provide a first input to cause the wireless communication device to start communication with the image forming apparatus by a wireless communication protocol;
in response to determining that the wireless communication device no longer detects the image forming apparatus by way of the short-range communication protocol:
hiding the input screen,
displaying a message on the display, the message including an operation to be performed using the wireless communication device to reestablish communication between the wireless communication device and the image forming apparatus using the short-range communication protocol and a second prompt for the user to provide a second input to the wireless communication device,
receiving the operation and the second input to the wireless communication device from the user, and
displaying the preview screen on the display in response to receiving the second input; and
in response to the first input being received by the wireless communication device when the input screen is displayed, hiding the input screen, redisplaying the preview screen, and communicating, by the short-range communication protocol and a wireless communication protocol different from the short-range communication protocol, with the image forming apparatus to enable the image forming apparatus to execute a printing function, the communicating including transmitting image data from the wireless communication device to the image forming apparatus using the wireless communication protocol different from the short-range communication protocol, starting a timer in a state that the second computer program has caused the input screen to be displayed on the display and prior to the image forming apparatus executing the printing function, the input screen being displayed based on the wireless communication device detecting the image forming apparatus using the short-range communication protocol; and in response to the timer having elapsed, displaying the message on the display regarding communication between the wireless communication device and the image forming apparatus using the short-range communication protocol.

* * * * *